(No Model.)
J. R. & T. W. FEELEY.
STOCK FOR MAKING ORNAMENTAL CHAINS.
No. 243,766. Patented July 5, 1881.
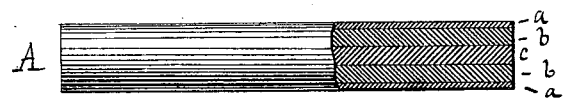
WITNESSES,
INVENTORS,

UNITED STATES PATENT OFFICE.

JAMES R. FEELEY AND THOMAS W. FEELEY, OF PROVIDENCE, R. I.

STOCK FOR MAKING ORNAMENTAL CHAINS.

SPECIFICATION forming part of Letters Patent No. 243,766, dated July 5, 1881.

Application filed May 7, 1881. (No model.)

*To all whom it may concern:*

Be it known that we, JAMES R. FEELEY and THOMAS W. FEELEY, of the city and county of Providence, in the State of Rhode Island, have invented a new and useful Improvement in Stock for Chain-Making; and we do hereby declare the following to be a specification thereof, reference being had to the accompanying drawing, which shows, in elevation and partially in longitudinal section, the improved wire which is our invention.

Our invention consists in a gold-plated wire having a central longitudinal core of solder, as hereinafter fully specified.

We draw down the plated stock into thin narrow strips, in the usual manner, one surface of the stock being gold and the remainder being of base metal, and proceed in the usual manner to draw said metallic strip into a tubular form through a draw-plate, the gold surface being upon the exterior of such tube. We then draw a solid wire of solder and insert the solder wire loosely into the tubular stock. The solder wire should be considerably longer than the gold-plated tube, so that when the latter is still farther drawn down it can extend upon and along the solder wire. The plated tube and the solder wire therein contained are together drawn through the draw-plate repeatedly until a solid wire of the desired size is produced. The wire so produced is shown in the drawing, and consists of the external layer of gold, *a*, the internal layer of base metal, *b*, and the central longitudinal core of solder, *c*. Thus at whatever point the wire A is cut transversely a surface of solder is exposed by the section. The wire A so made is cut into proper lengths and bent into chain-links. The ends of these links are united together by fusing the solder contained therein in the usual manner, and the result is that the links are soldered only upon the interior and unexposed surfaces of the transverse sections of the wire, leaving all the exterior and exposed surfaces of gold clean and pure.

A difficulty commonly experienced in chain-making is in soldering the links. The solder has hitherto been laid between the ends of the links to be united and then fused; but a portion of the solder is thus exposed, and is liable, when melted, to flow down more or less upon the link, covering the gold plate, defacing the chain, and corroding and blackening by exposure to the air or contact with corrosive substances or gases. This difficulty is wholly obviated by our invention, the central core of solder uniting the ends of the links upon surfaces which, in the completed link, are wholly internal and unexposed.

Our invention effects a saving in labor and waste amounting to thirty or thirty-five per cent. It does away with the labor of picking up the bits of solder by a wet hair pencil or brush and the inserting of such piece of solder between the ends of the link. As in our improved wire the solder is already in position, this labor is unnecessary; and as the solder in our wire does not flow down upon the outside of the links, all the waste occasioned by the removal and loss of such defaced links is prevented.

The wire may be drawn either in a cylindrical or angular form, as may be desired.

The essential feature of our invention being the internal core or plug of solder surrounded by gold or gold-plated stock, it is obviously within our invention if such core of solder occupy any internal position in the wire, whether central or otherwise, and also that a gold wire having such internal core of solder would be within our invention.

Instead of drawing down the tubular stock upon a solid wire of solder, we may braze a bar of solder upon the metallic strip of gold or gold-plated stock and draw them both down together into a solid wire.

We claim as a novel and useful invention and desire to secure by Letters Patent—

1. The improved wire A, consisting of the external layer of gold, *a*, the internal layer of base metal, *b*, and the core or plug of solder *c*, substantially as and for the purpose specified.

2. An improved wire, A, having an external surface of gold and an internal core of solder, substantially as described.

JAMES R. FEELEY.
THOMAS W. FEELEY.

Witnesses:
WALTER B. KINGSLEY,
WARREN R. PERCE.